United States Patent
Therani et al.

(10) Patent No.: US 11,386,344 B2
(45) Date of Patent: Jul. 12, 2022

(54) METHOD FOR AUTOMATIC ESTIMATION OF SPATIO-TEMPORAL ENTITY COUNTS USING MACHINE LEARNING FROM PARTIALLY OBSERVABLE LOCATION DATA

(71) Applicant: Near Pte. Ltd., Singapore (SG)

(72) Inventors: Madhusudan Therani, San Jose, CA (US); Shobhit Shukla, Bangalore (IN)

(73) Assignee: Near Intelligence Holdings, Inc., Pasadena, CA (US)

( * ) Notice: Subject to any disclaimer, the term of this patent is extended or adjusted under 35 U.S.C. 154(b) by 350 days.

(21) Appl. No.: 16/792,236

(22) Filed: Feb. 15, 2020

(65) Prior Publication Data
US 2021/0256407 A1    Aug. 19, 2021

(51) Int. Cl.
| | | |
|---|---|---|
| *G06F 16/00* | (2019.01) | |
| *G06N 7/00* | (2006.01) | |
| *G06N 20/00* | (2019.01) | |
| *G06F 16/29* | (2019.01) | |
| *G06F 16/23* | (2019.01) | |
| *G06F 16/28* | (2019.01) | |
| *G06F 16/2458* | (2019.01) | |
| *G06F 16/2455* | (2019.01) | |

(52) U.S. Cl.
CPC ......... *G06N 7/005* (2013.01); *G06F 16/2379* (2019.01); *G06F 16/2474* (2019.01); *G06F 16/24568* (2019.01); *G06F 16/288* (2019.01); *G06F 16/29* (2019.01); *G06N 20/00* (2019.01)

(58) Field of Classification Search
CPC .......... G06F 16/24586; G06F 16/2379; G06F 16/288; G06F 16/2474; G06F 16/29
See application file for complete search history.

(56) References Cited

U.S. PATENT DOCUMENTS

| | | | |
|---|---|---|---|
| 2015/0227851 A1* | 8/2015 | Kaisser | H04W 4/21 706/11 |
| 2019/0295408 A1* | 9/2019 | Wynter | G06Q 50/30 |
| 2020/0065840 A1* | 2/2020 | Pinel | H04W 4/021 |
| 2020/0077282 A1* | 3/2020 | Bhorkar | H04W 24/02 |
| 2020/0141598 A1* | 5/2020 | Ahuja | F24F 11/30 |
| 2020/0213865 A1* | 7/2020 | Lin | H04W 12/06 |
| 2021/0258742 A1* | 8/2021 | Sakai | H04W 4/08 |

* cited by examiner

*Primary Examiner* — Khanh B Pham

(57) ABSTRACT

Disclosed is a system for automatically estimating spatio-temporal entity counts in real time and for a future time window using machine learning from partially observable location data. The system includes a data aggregator, a hyper-cube computational data structure, a geo coder, a geolocation mapper, a key value data structure updater, a hyper cube estimator, a census-based extrapolator, and an entity estimator. The entity estimator (i) determines an entity count for each or combinations of the one or more spatio temporal dimensions in real time by combining lower bound number and upper bound number of the entity count from the hyper cube estimator and the census based extrapolator, and (ii) estimates, using a machine learning based time series model, spatio temporal entity count for a future time window in response to a query criterion.

20 Claims, 9 Drawing Sheets

OBTAINING IN REAL TIME, USING A DATA AGGREGATOR, A PLURALITY OF DATA STREAMS WITH A UNIQUE ENTITY IDENTIFIER FROM INDEPENDENTLY CONTROLLED SOURCES
702

TRANSFORMING, USING A GEOCODER, THE PLURALITY OF DATA STREAMS INTO GEO LOCATION OF THE ENTITY
704

IDENTIFYING, USING A GEO LOCATION MAPPER, CORRESPONDING GEO LOCATION OF THE ENTITY IN A HYPER-CUBE COMPUTATIONAL DATA STRUCTURE THAT IS SPATIALLY PARTITIONED WITH GEO HASHES IN TERMS OF A KEY VALUE DATA STRUCTURE FOR A PLURALITY OF GEO LOCATIONS BY MAPPING THE GEO LOCATION OF THE ENTITY WITH THE KEY VALUE DATA STRUCTURE IN THE HYPER-CUBE COMPUTATIONAL DATA STRUCTURE
706

UPDATING IN REAL TIME, USING A KEY VALUE DATA STRUCTURE UPDATER, THE KEY VALUE DATA STRUCTURE THAT CORRESPONDS TO GEO LOCATION OF ENTITY, WITH THE UNIQUE ENTITY IDENTIFIER AND THE TIMESTAMP DATA
708

DETERMINING, USING A HYPER CUBE ESTIMATOR, A LOWER BOUND NUMBER OF AN ENTITY COUNT FOR EACH OR COMBINATIONS OF A PLURALITY OF SPATIO-TEMPORAL DIMENSIONS BASED ON THE UNIQUE ENTITY IDENTIFIER AND THE TIMESTAMP DATA UPDATED IN THE GEO LOCATION OF THE KEY VALUE DATA STRUCTURE
710

DETERMINING, USING A CENSUS-BASED EXTRAPOLATOR, AN UPPER BOUND NUMBER OF THE ENTITY COUNT FOR EACH OR COMBINATIONS OF THE PLURALITY SPATIO-TEMPORAL OF DIMENSIONS BY EXTRAPOLATING RECENT CENSUS DATA
712

METHOD FOR AUTOMATIC ESTIMATION OF SPATIO-TEMPORAL ENTITY COUNTS USING MACHINE LEARNING FROM PARTIALLY OBSERVABLE LOCATION DATA

BACKGROUND

Technical Field

The embodiments herein generally relate to entity count estimation, and more particularly, to an automatic system and method for estimating spatio-temporal entity counts in real time as well as in future using machine learning from partially observable location data.

Description of the Related Art

In general, data driven estimations are fundamental to a variety of business and engineering problems. From prediction to developing control actions, a good estimate is essential. Audience or population estimation is the process of identifying a size or count of an audience currently available to engage at a given location and time. The audience or population estimation is a major research activity for all global and governmental agencies and finding better ways of estimating the population is a top-line research activity. One of the major tasks for media planning is audience (or reach) estimation. Media planning is a process of identifying media vehicles such as Newspaper, Magazines, Website, Television etc. to which an advertisement is to be communicated to reach a target audience at most effective cost. The ultimate goal of media planning is to reach the right audience at the right time with the right message to generate desired response at most effective cost. Attaining a reasonably reliable audience estimate is key to set a goal and cost of a marketing campaign. Estimating the audience in a reliable manner is a major problem which is faced by media planners and others who rely on the entity estimation.

So far, there have been several attempts to estimate audiences accurately which are done in an ad hoc manner. Further, most of those approaches mostly rely on census data to get the estimate of an audience. However, in many countries, the census data may not be available. Historically, the media planners in the early days of TV and Radio broadcasting used the number of households in a geo area and the population therein to estimate audience. The estimates based on the number of households are static which is updated seasonally. For print media, the media planners relied on seasonal subscription numbers such as newspapers and magazines. For out-of-home media such as billboards, the media planner relies on traffic data and residential area data, but solutions are geo-specific. Typically, sample-based approaches are used for entity estimation, wherein panels (paid or otherwise) are extrapolated on different dimensions of interest. However, the quality of the estimate varies based on panel scale and panel coverage. Even, in the age of extreme human mobility and the online web activity, these basic estimation approaches have still not evolved. The media planners still rely on website publishers and third-parties to provide them how many people viewed the website. However, the digital page visit data is plagued by issues of duplicate identifiers and fraud. There is no "stable" correlation between actual population and digital activity.

In addition to above basic problems, raw data sources that are basically used to count people vary every day. Sometimes, the data sources go on and off for many reasons such as outages, hardware failure, software failure, network failure, no network access, endpoint failure, intermediaries in the flow, corrupted events, blocked events, dropped events, lost event, user shutdown device. For example, in airports or prime-time hours when a major event is ongoing etc., the data flow may be interrupted. Hence, the data may not be received in some regions/areas or time windows. Further, multiple sources of data overlap cause to count the same people in variable number of times as the people move around within regions, within countries, across countries. Further, some of the data sources have to be paid for and some of the data sources may not be accessible. Data is also protected for privacy reasons in some countries (e.g. Europe). Hence, only partial data may be available on a daily basis. This may lead to variation in the number of people estimated from that partial data. This may be 40% on day 1 and may be 80% for the next day.

Furthermore, when media cycles are considerably shorter and have to adapt continuously, niche audiences are required. In that case, the conventional estimation techniques do not directly scale well. The media planners may still need an independent machinery to estimate audiences in both online and offline to provide a reliable benchmark. Consequently, improvements are needed for estimating spatio-temporal functions based on partially observable near real-time data sources.

In view of the foregoing, a system to process human mobility data points in a real-world environment, multiple requirements exist, such as scalability, robustness, ability to deal with uncertainty (i.e. partial data) since single user may use multiple devices such as phone, television, personal computer which in turn engaged with plurality of applications. In some scenarios, there may be a need to sample effectively (possibly by discarding some portions of data) for supporting scalability, as the time available to make a decision is decreasing and the flow of the data is increasing. The data is contextually relevant for a short time period.

Existing approaches may do this for multiple streams but those streams are controlled by the same entity. It is quite a complex process for merging data streams from independently controlled data sources.

A human (or a group of people) cannot do this estimation as a standalone function due to large scale of data from multiple sources and there is a need to process this data to infer the tunable estimation parameters.

Accordingly, there remains a need for an automatic system and method for estimating spatio-temporal entity counts in real time and for future based on human mobility data which is computationally more efficient even if the data is partially observable and also time available to take decision is limited.

SUMMARY

In view of the foregoing, an embodiment herein provides a method of automatically estimating spatio-temporal entity counts in real time and for a future time window using machine learning from partially observable location data. The method includes the steps of (a) obtaining, in real time, one or more data streams with a unique entity identifier from independently controlled sources, wherein the one or more data streams includes timestamp data and location indexed data that partially characterizes an activity of an entity associated with the unique entity identifier; (b) transforming, using a geocoder, the one or more data streams into geolocation of the entity; (c) identifying, using a geolocation mapper, corresponding geolocation of the entity in a hypercube computational data structure that is spatially partitioned with geo hashes in terms of a key value data structure for one or more geolocations by mapping the geolocation of the entity with the corresponding key value data structure in the hyper-cube computational data structure; (d) updating, in real time, the key value data structure that corresponds to geolocation of the entity, with the unique entity identifier and the timestamp data; (e) determining, using a hyper-cube estimator, a lower bound number of an entity count for each or combinations of one or more spatio temporal dimensions based on the unique entity identifier and the timestamp data updated in the geolocation of the key value data structure; (f) determining, using a census-based extrapolator, an upper bound number of the entity count each or combinations of the one or more spatio temporal dimensions by extrapolating recent census data; (g) combining, using an entity estimator, the lower bound number and the upper bound number of the entity count for determining an entity count for each or combinations of the one or more spatio temporal dimensions in real time using a machine learning based time series model; and (h) estimating, using the machine learning based time series model, spatio temporal entity count for a future time window in response to a query criterion.

In an embodiment, the one or more spatio temporal dimensions include (i) a location, (ii) individual attributes, (iii) a time window/activity or (iv) a combination thereof.

In one embodiment, the lower bound number of the entity count for each or combinations of the one or more spatio temporal dimensions is determined by (i) identifying a dimensional factor for each of the one or more spatio temporal dimensions by processing the unique entity identifier and the timestamp data updated in the geolocation of the key value data structure; and (ii) determining the lower bound number of the spatio temporal for each or combinations of the one or more spatio temporal dimensions based on the dimension factor of each of the one or more spatio temporal dimensions and base cardinality of each or combinations of the plurality of spatio temporal dimensions.

In another embodiment, the method further includes updating, using Bayesian updating techniques, the dimensional factor when a new data stream arrives for the data aggregator.

In yet another embodiment, the machine learning based time series model is configured to train with real time entity count data to receive an input query related to entity count and to output spatio-temporal entity counts in response to the input query.

In yet another embodiment, the location indexed data includes latitude data and longitude data.

In yet another embodiment, the key value data structure is maintained temporally for each of the one or more spatio temporal dimensions.

In yet another embodiment, the one or more data streams further includes at least one of (i) non location indexed traffic data, (ii) digital visit count to a global website or (iii) social media activities.

In yet another embodiment, the method includes generating, using a sample generation method, a ground truth data based on traffic and navigation data associated with the one or more entities for validating the determined entity count in real time for each or combinations of the one or more spatio temporal dimensions, wherein the traffic and navigation data is obtained from traffic sensors or a public CCTV camera.

In yet another embodiment, the one or more data streams with a unique entity identifier are obtained from one or more entity devices engaged with at least one of (i) a plurality of applications, (ii) a wireless network, or (iii) a mobile network.

In yet another embodiment, the method includes de-duplicating the one or more data streams from the one or more entity devices engaged with at least one of (i) the one or more applications, (ii) the wireless network, or (iii) the mobile network, based on the unique entity identifier.

In yet another embodiment, the method further includes segmenting, using one or more attributes, the estimated spatio-temporal entity count (i) for delivering target media content and communicating the target media content to the one or more entity devices associated with the segmented spatio-temporal entity count, (ii) for traffic estimation on road networks, (iii) for population diffusion estimation in an area, and (iv) number of physical stores estimation in different areas by product category.

In one aspect, a system for automatically estimating spatio-temporal entity counts in real time and for a future time window using machine learning from partially observable location data is provided. The system comprises (a) a data aggregator that is configured to obtain, in real time, one or more data streams with a unique entity identifier from independently controlled sources, wherein the one or more data streams includes time stamp data and location indexed data that partially characterizes an activity of an entity associated with the unique entity identifier; (b) a geo coder that is configured to transform the one or more data streams into geolocation of the entity; (c) a geolocation mapper that is configured to identify corresponding geolocation of the entity in a hyper-cube computational data structure that is spatially partitioned with geo hashes in terms of a key value data structure for one or more geolocations by mapping the geolocation of the entity with the key value data structure in the hyper-cube computational data structure; (d) a key value data structure updater that is configured to update in real time the key value data structure that corresponds to geolocation of the entity, with the unique entity identifier and the time stamp data, (d) a hyper-cube estimator that is configured to determine a lower bound number of an entity count for each or combinations of one or more spatio temporal dimensions based on the unique entity identifier and the timestamp data updated in the geolocation of the key value data structure; (e) a census-based extrapolator that is configured to determine an upper bound number of the entity count for each or combinations of the one or more spatio temporal dimensions by extrapolating recent census data, and (f) an entity estimator that is configured to (i) determine an entity count for each or combinations of the one or more spatio temporal dimensions in real time by combining the lower bound number and the upper bound number of the entity count using a machine learning based time series model, and (ii) estimate, using the machine learning based time series model, spatio temporal entity count for a future time window in response to a query criterion.

In another aspect, one or more non-transitory computer-readable storage mediums storing the one or more sequences of instructions, which when executed by the one or more processors, causes to perform a method of automatically estimating spatio-temporal entity counts in real time and for a future time window using machine learning from partially observable location data is provided.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 7A and FIG. 7B are flowcharts that illustrate a method of estimating spatio-temporal entity counts in real time as well as in future time window according to an embodiment herein.

DETAILED DESCRIPTION OF PREFERRED EMBODIMENTS

Figure 1:
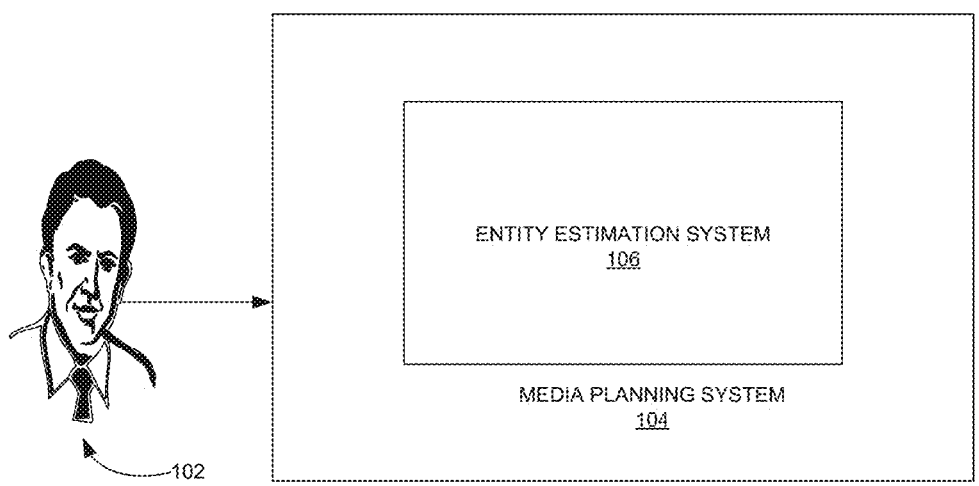
FIG. 1 is a schematic diagram that illustrates a media planner interacting with an entity estimation system according to an exemplary embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method to estimate spatio-temporal entity counts for a selective-criteria in real time and for a future time window to enable strategy creation for media planning, traffic estimation on road network, population diffusion estimation in an area after an event, and number of physical store estimation in different areas by product category. The embodiments herein achieve this by proposing a system that estimates spatio-temporal entity counts in real time and in future based on one or more data streams associated with one or more entity activity. Referring now to the drawings, and more particularly to FIGS. 1 through 8, where similar reference characters denote corresponding features consistently throughout the figures, there are shown preferred embodiments.

The term "independently controlled sources" refers to any source that may control or standardize different aspects of data streams. The different aspects include but not limited to 1) What data can be collected?, 2) When and where the data is collected?, 3) How the data is collected?, 4) How collected data can be modified?, 5) What data is public, 6) What data is protected?, 7) What data can be permitted by a consumer/user of the application/device?, and 8) What data is completely private?

The term "partial observable data or partial data" refers to a data stream where all the events are not captured due to several reasons.

The term "one or more streams from independently controlled sources" refers to data stream from independently controlled sources. For example, consider a consumer using multiple applications on his android phone, as he/she interacts with each application, multiple independent streams of events are produced since, each application being an independent source. Events and users may have different identifiers across different applications depending on how it is implemented. Additionally, if one were to monitor the network, each application level event may generate additional lower level network events.

FIG. 1 is a schematic diagram that illustrates a media planner 102 interacting with an entity estimation system 106 according to an exemplary embodiment herein. The entity estimation system 106 embedded in a media planning system 104. The media planner 102 may be any person who needs estimation of spatio-temporal entity counts for a selected dimension. In one embodiment, the spatio temporal entity counts includes but not limited to a population count, a car count, a building count, and an apparatus count etc. In one embodiment, the dimension includes but not limited to a location, individual attributes, a time window per activity, or a combination thereof. In one embodiment, the individual attributes include but not limited to gender, age-group, personal interests, a frequency of visits, a profile category, a content category, a content type, a time period per day, a time interval, a spatial location of residential region, a spatial location of points of interest, spatial location of place categories, a weekday versus weekend, an ID type across stream, media-consumption habits, and behaviors. The entity estimation system 106 detects spatio-temporal entity counts in real time and for a future time window as per a query criteria provided to the entity estimation system 106. In one embodiment, the media planning system 104 further segments, using one or more attributes, the estimated spatio-temporal entity count for delivering target media content to the segmented spatio-temporal entity count. In one embodiment, the media planning system 104 includes, but not limited to, a media campaign planning system. The entity estimation system 106 runs daily census per location or region or country.

In one exemplary embodiment, the entity estimation system 106 may optionally embedded in a traffic estimation system for estimating traffic on road networks. In another exemplary embodiment, the entity estimation system 106 may optionally embedded in a population diffusion estimation system for estimating population diffusion in an area after an event. In yet another exemplary embodiment, the entity estimation system 106 may optionally embedded in an entity detector for estimating number of physical stores in different areas by product category.

Figure 2:
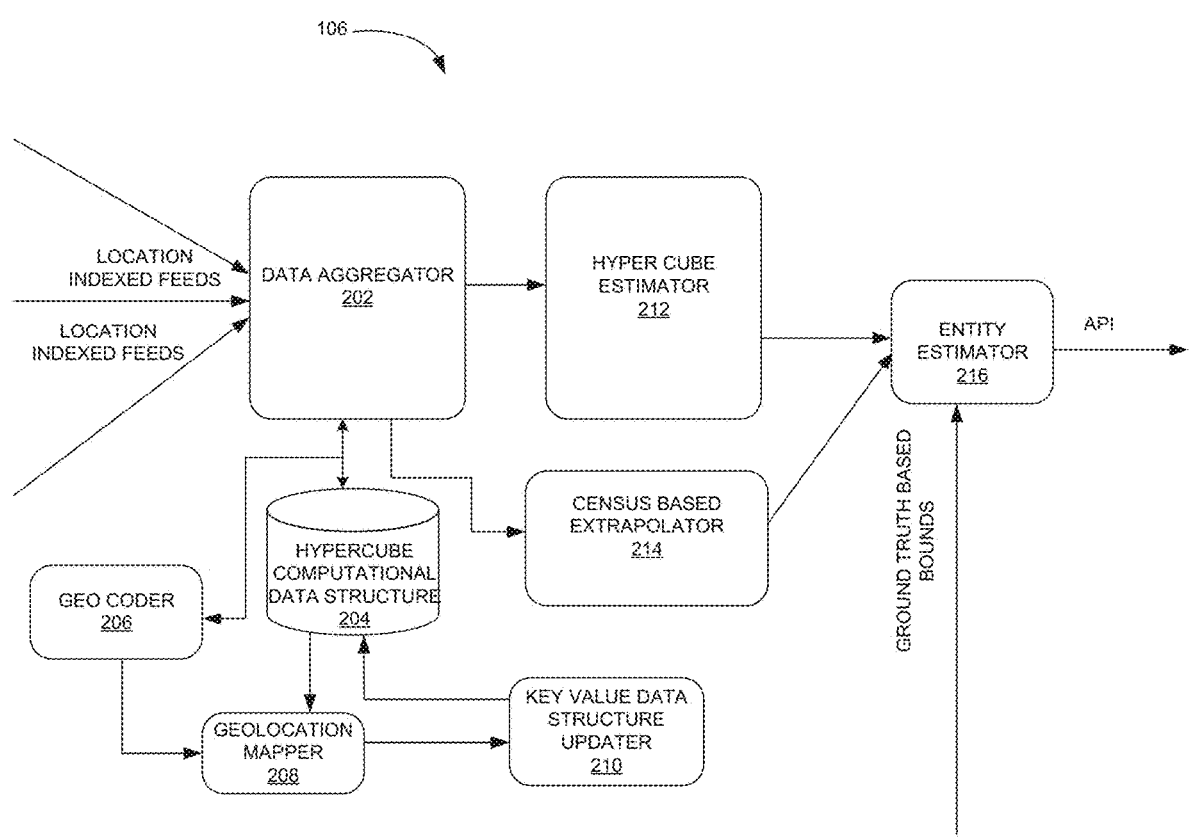
FIG. 2 is an exploded view of the entity estimation system of FIG. 1 according to an embodiment herein.

FIG. 2 is an exploded view of the entity estimation system 106 of FIG. 1 according to an embodiment herein. The entity estimation system 106 includes a data aggregator 202, a hyper-cube computational data structure 204, a geo coder 206, a geolocation mapper 208, a key value data structure updater 210, a hyper cube estimator 212, a census-based extrapolator 214, and an entity estimator 216. The data aggregator 202 obtains one or more data streams with a unique entity identifier from independently controlled sources. The one or more data streams include timestamp data and location indexed data that partially characterizes an activity of an entity associated with the unique entity identifier. In one embodiment, the data aggregator 202 obtains one or more data streams associated with one or more entities. In one embodiment, the one or more data streams with a unique entity identifier are obtained from the one or more entity devices engaged with at least one of (i) a plurality of applications, (ii) a wireless network, or (iii) a mobile network. In one embodiment, the data aggregator 202 captures one or more data streams in real time over a network. In one embodiment, the network includes a wireless network or a wired network. In one embodiment, the one or more entity devices includes but not limited to a mobile device, a smart phone, a personal digital assistant (PDA), a notebook, a Global Positioning System (GPS) device, or any network enabled device. In one embodiment, the location indexed data includes latitude data and longitude data. In one embodiment, the one or more data streams include non-location indexed data. In one embodiment, the non-location indexed data includes Internet Protocol (IP) information. In one embodiment, the one or more data streams includes (i) location pings from one or more application engaged on the one or more entity devices, (ii) access pings from wireless hot-spots, (iii) active subscriber's data & location in different geo-areas (GSM) from the mobile network, and (iv) local information from traffic sensors or a public CCTV camera for security and others. In some embodiments, the one or more data streams include digital visit count to a global website and social media activities. In one embodiment, the one or more data streams include census related data. In one embodiment, the data aggregator 202 obtains the census related data from a global census database. In one embodiment, the data aggregator 202 obtains the census related data from third party sources. In one embodiment, the unique entity identifier is unique for each of one or more entity devices. In one embodiment, the unique entity identifier is unique device identifier. In one embodiment, the unique entity identifier includes but not limited to in-app Advertising ID, Cookie ID, MAC IDs, Publisher-specific ID schemes. In one embodiment, the data aggregator 202 includes a communication module to obtain one or more data streams. In one embodiment, a single entity may optionally engage with one or more entity devices. In one exemplary embodiment, the unique entity identifier is globally unique for a single entity (even the single entity owns multiple devices) which is generated on the fly before reaching the data aggregator 202. In one exemplary embodiment, the entity estimation system 106 is communicatively connected with a system that is capable of linking one or more entity identifiers to generate the unique entity identifier using a clustering device, a disambiguator and a validator.

In an embodiment, the entity estimation system 106 may optionally include a clustering device, a disambiguator and a validator. The clustering device receives the one or more data streams and clusters the one or more entity devices by identifying entity devices having an association with each other with respect to at least one of an internet protocol (IP) address, a real-time event, a period of time or a location. The disambiguator analyses the clusters obtained from the clustering device and identifies sub-clusters that resolve to a single entity. The validator validates the single entity owns all the devices that exist in the sub-cluster against entity behavioral attributes and generates a unique entity identifier which corresponds to the single entity. In an embodiment, the unique entity identifier is also mapped to a home location of the single entity which enables the persistence of the unique entity identifier compared to traditional anonymized identifiers.

In an exemplary embodiment, John owns five devices. The incoming data streams from the five devices of John include five identifiers namely C1, C2, P1, P2, and T1 along with other payload information. The clustering device clusters the five identifiers namely C1, C2, P1, P2, and T1 based on at least one of the internet protocol (IP) address, real-time event, a period of time or a location. The disambiguator links these five identifiers and maps the unique user identifier "9517ANR". Further, the disambiguator discerns patterns of identifiers that appear to always be "on the move" together and validates behavior signals from various identifiers in order to generate the unique entity identifier "9517ANR". The behavioral attributes that are associated with all the individual identifiers may include male, 26-35, business professional, fitness freak, affluent, gamer, loves soccer and/or tennis. The disambiguator analyses the available clusters and starts to disambiguate or discern patterns of identifiers that are observed to always be together in spatio-temporal occurrences.

In an exemplary embodiment, a unique entity identifier "1001" has categorical attributes known to be a male, has a mobile identifier "$1001\_m$" and has a plurality of cookie identifiers namely "$1001\_c\_1$", "$1001\_c\_2$", "$1001\_c\_3$" associated with it. A validator optionally embedded in the entity estimation system 106 validates which cookies truly map to this mobile identifier "$1001\_m$". The above set of identifiers is generated from 3 candidate pairs which are a union of ($1001\_m, 1001\_c\_1$), ($1001\_m, 1001\_c\_2$) and ($1001\_m, 1001\_c\_3$). The validator runs an engagement activity that targets a male segment for which the unique entity identifier "1001" is a member of. Further, the validator runs an engagement activity on mobile device identifiers which include targeting the unique entity identifier $1001\_m$ and also a cookie engagement activity consisting of all the cookies that are linked with the unique entity identifier "1001". The validator validates if engagement is received for both the mobile identifier "$1001\_m$" and set of cookies identifiers, it is validated that they both refer to the same individual.

In an embodiment, the entity estimation system 106 may optionally include an event classifier that classifies a unified entity event from the one or more data streams along with dynamic entity attributes retrieved from a distributed memory store. In one embodiment, the unified entity event includes the values of the entity attributes.

The hyper-cube computational data structure 204 is spatially partitioned with geo hashes in terms of a key value data structure for each geolocation. In one embodiment, the hyper-cube computational data structure 204 includes heterogeneous collection of geo hashes. In one embodiment, the hyper-cube computational data structure 204 includes a combination of geo hashes at granularity. In one embodiment, the key value data structure is a Hyper Log Log (HLL) data structure. In one embodiment, the key value data structure is maintained temporally on per day basis, per hour basis, or in a rolling 30-day window. In exemplary embodiment, a country is represented by $1 \times 10^6$ HLLs in the hyper-cube computational data structure 204 that maintain a million keys for every day (similar for every 4-hour window). For a 30 day period, the key value data structure maintains 30 million keys.

The geo coder 206 transforms the one or more data streams into geolocation of the entity. In one embodiment, the geo coder 206 transforms latitude data and longitude data into geolocation of the entity. In one embodiment, the geolocation is represented in a form of geo hashes in the hyper-cube computational data structure 204.

The geolocation mapper 208 identifies corresponding geolocation of the user in a hyper-cube computational data structure 204 that is spatially partitioned with geo hashes in terms of a key value data structure for one or more geolocations by mapping the geolocation of the entity with the key value data structure in the hyper-cube computational data structure 204.

In one embodiment, the one or more geolocation includes but not limited to region, points of interest, and place categories.

The key value data structure updater 210 updates the key value data structure that corresponds to geolocation of the entity in real time, with the unique entity identifier and the timestamp data. In one embodiment, each HLL in the hyper-cube computational data structure 204 includes a number of unique entity identifiers along with timestamp data on hourly basis, daily basis, weekly basis, 30 days windows etc.

The entity estimation system 106 deduplicates one or more entity entry in the key value data structure based on the unique entity identifier in the one or more data streams.

The hyper cube estimator 212 determines a lower bound number of an entity count for each or combinations of one or more spatio temporal dimensions based on the unique user identifier and the timestamp data updated in the geolocation of the key value data structure. In one embodiment, the one or more spatio temporal dimensions include but not limited to spatial locations/regions, spatial locations/Points-of-Interest, spatial locations/place categories, time intervals, gender, age groups, frequency of visits, profile categories, content categories, content type, ID types across streams, and time periods per day.

In one embodiment, the hyper cube estimator 212 determines the lower bound number of an entity count for each or combinations of the one or more spatio temporal dimensions by (i) identifying a dimensional factor for each spatio temporal dimension by processing the number of unique entity identifier and timestamp data stored in the key value data structure according to each dimension and (ii) determining the lower bound number of the entity count for each or combinations of the one or more spatio temporal dimensions based on the dimension factor for each of the one or more spatio temporal dimensions and base cardinality of each or combinations of the one or more spatio temporal dimensions. In an embodiment, the base cardinality of each or combinations of the one or more spatio temporal dimensions is determined using standard union and intersection operations on the HLL data.

In an exemplary embodiment, the hyper cube estimator 212 processes data from the key value data structure for every 30 days to determine the dimensional factor for each spatio temporal dimension.

In an embodiment, the hypercube estimator 212 embeds a data-driven machine learning (ML) model that runs periodically to estimate dimension factors for each hyper-cube dimension based on the incoming data streams of the past week. In an embodiment, the data-driven machine learning (ML) model runs on a weekly basis to estimate the dimension factors. For various cells of the hypercube computational data structure, this data-driven ML model is run to update the dimension factors to accommodate the changes in real-world human mobility activity and availability of new data sets. The hypercube estimator 212 constantly updates the lower-bound number of the entity count for each or combinations of one or more spatio temporal dimensions in accordance with the dimension factors driven by the data-driven ML model.

In another exemplary embodiment, the hyper cube estimator 212 determines a dimensional factor, for example, visit frequency dimensional factor for a place category (e.g. Fast food place category) by (i) counting all unique individuals who visited fast food place category from the corresponding 30 days HLL data with the unique entity identifier (hereinafter A), (ii) counting a number of users actually visited the fast food place category multiple number of times (e.g. >3 times) from raw count data (hereinafter B), and (iii) determining the visit frequency dimensional factor by dividing B by A.

In one embodiment, the hyper cube estimator 212 periodically validates the dimension factor based on actual ambient population estimation from any third-party sources of data. In one embodiment, the third-party sources may include but not limited to various Data Management Platform (DMP) and Customer Data Platforms (CDP).

In one embodiment, the hyper cube estimator 212 updates the dimension factors when new data streams arrive. In one embodiment, the hyper cube estimator 212 uses Bayesian techniques to update the dimension factors by (i) receiving the new data streams from the one or more user devices (ii) identifying the dimension factor related to the new data streams and (iii) updating the dimension factor based on the value of the new data streams. In one embodiment, the hyper cube estimator 212 detects anomalies when specific events happen or the traffic is bursty for example.

In one embodiment, the hyper cube estimator 212, using the Spatial Kriging technique, estimate the entity counts in real time for a first region with no data or partial data related to one or more entities based on a second region with complete data related to one or more entities. The first region and the second region are closely related region.

The census-based extrapolator 214 determines an upper bound number of the entity count for each or combinations of the one or more spatio temporal dimensions by extrapolating recent census data obtained from the global census database and other third party sources. In one embodiment, the recent census data includes but not limited to (i) raw census data from each country which is done periodically at intervals of 5 or 10 years and (ii) physical counts of "living spaces"—residential areas/urban planning info in advanced countries. The raw census data provides data by small regions (census blocks) and demographics and other info at a collective level (via self-disclosed surveys and/or interviews). In one embodiment, the census-based extrapolator 214 determines the upper bound number of the entity count for each or combinations of the one or more spatio temporal dimensions by (i) determining a first population count by adding (a) a function of census count in a region that is multiplied by mobile penetration factor in the region) and (b) a population growth rate that is multiplied by the census (i.e. from a time census taken), (ii) determining a second population count based on population with additional inflow/outflow from neighboring regions, and (iii) determining the upper bound number of the entity count by adding first population count and second population count. In an embodiment, the census-based extrapolator 214 considers inflows and outflows during 12 PM-12 AM (normal outdoor human activity).

In an embodiment, the census-based extrapolator 214 embeds a Bayesian model to accommodate updated data sets from different sources. As new evidence/priors become available from third party sources on census related metrics, the census-based extrapolator 214 runs probabilistic Bayesian model to estimate new extrapolation dimension factors. The factors that change dynamically include population growth, mobile penetration, migration patterns (long term and short term) and economic growth factors. The hypercube estimator 212 constantly updates the upper-bound number of the entity count for each or combinations of one or more spatio temporal dimensions in accordance with the dimension factors driven by the Bayesian model.

The entity estimator 216 determines an entity count for each or combinations of the one or more spatio temporal dimensions in real time by combining the lower bound number and the upper bound number of the entity count. In one preferred embodiment, the entity estimator 216 estimates the entity count for each or combinations of the one or more spatio temporal dimensions as a function of Lower bound number of entity count and the dimension factor (i.e. Upper bound number of entity count minus Lower bound number of entity count). In one embodiment, the dimension factor is determined based on a maximum bump historically in our traffic from the mean traffic. In one embodiment, the entity estimator 216 validates the entity count estimate with ground truth data or actual entity estimation in real time.

In one embodiment, the entity estimation system 106 generates, using a sample generation method, a ground truth data, based on traffic and navigation data associated with the one or more entities for validating the estimated entity count in real time for each or combinations of the one or more spatio temporal dimensions. In one embodiment, the traffic and navigation data are obtained from traffic sensors or a public CCTV camera. In one embodiment, the sample generation method includes but not limited to Simple Random Sampling (SRS), Cluster Sampling (CS), Stratified Random Sampling (STRAT), Systematic Sampling (SYSTEM), and Stratified Systematic Unaligned Sampling (SSUS).

The entity estimator 216 provides validated real time entity count as a training data via. a model updater to a machine learning based time series model executed on the entity estimator 216. The entity estimator 216 estimates, using the machine learning based time series model, spatio temporal entity count in a future time window in response to a query criterion. In one embodiment, the future time window includes but not limited to a next day, a next week, next 30 days or any arbitrary time window in future.

In an embodiment, the entity estimator 216 embeds an Auto Regressive Integrated Moving Average (ARIMA) model to estimate spatio-temporal entity count in the future time window in response to a query criterion. In one embodiment, the entity estimator 216 embeds an exponential smoothing model to estimate spatio-temporal entity count in the future time window in response to a query criterion.

In one embodiment, the entity estimator 216 segments, using one or more attributes, the estimated spatio-temporal entity count(i) for delivering a target media content (e.g. advertisements) and for communicating the target media content to the one or more devices associated with the segmented spatio-temporal entity count over a network, (ii) for traffic estimation on road networks, (iii) for population diffusion estimation in an area, and/or (iv) for estimating number of physical stores in different areas by a product category.

In an exemplary embodiment, for a query "Give the counts of females, who are aged 45+, in Sydney, who go to cafes more than 3 times a week and love sports—in the past 30 days". In one approach, for the above query, the entity estimation system 106 (i) obtains past 30 days HLL data for Sydney metro area that the past 30 days HLL data which includes a number unique entity identifier and timestamp data, (ii) performs an union operation on Sydney metro area count HLLs for each day of the 30 day, (iii) performs intersection operation on output from the union operation with HLL for females (maintained for a 30 day period), and/or (iv) multiplies the output from the intersection operation with estimated two dimensional factors to obtain estimate of population for the above query. The two dimensional factor for the above query includes frequency of visits to cafes and people/user who are interested in sports content category. In one embodiment, the frequencies of visits to cafes and people who are interested in sports content category are determined based on the past data related to café visit and sports content category interest in the HLL.

In another approach, for the above query, the entity estimation system 106 (i) obtains past 30 days HLL data for Sydney metro area that the past 30 days HLL data which includes a number of unique entity identifier and timestamp data, (ii) performs an union operation on Sydney metro area count HLLs for each day of the 30 day (iii) performs a first intersection operation on output from the union operation with HLL for females (maintained for a 30 day period), (iv) performs a second intersection operation on output from the first intersection operation with HLL that tracks visits to sports places over a 30 day period, (v) multiplies the output from the second intersection with estimated dimension factor to obtain estimate of population for the above query. The dimension factor for the above query includes frequency of visits to cafes. For each visit frequency, weights are estimated on past visit data in the HLL.

In one embodiment, the entity estimation system 106 considers non-location indexed traffic data for population estimation. The geo coder 206 applies latitude and longitudes to Internet Protocol (IP) information in the non-location indexed traffic data and then transforms the latitude and longitudes of IP information into geo hashes.

In the preferred embodiments, the entity estimation system 106 merges one or more data streams from the independently controlled sources onto a single timeline to reconstruct the entity device usage behavior in a given time window using statistical techniques along with contextual knowledge. Different kinds of such digital exhaust provide different kinds of cues into understanding the overall context.

In an embodiment, the entity estimation system 106 is communicatively connected to an entity cohort system that is used to cohort the estimated entity count. The entity cohort system captures the values of the entity attributes from the unified entity event in a document associated with the entity by invoking one or more segmentation rules from a rules database and compares the values of entity attributes in the unified entity event with the one or more segmentation rules. In an embodiment, the document includes all values of the entity attributes that have seen for the entity.

In an embodiment, the entity cohort system profiles the entity by reverse searching to match the document associated with the entity with one or more query that is applicable to the entity. The one or more query is a segment definition comprising entity attributes in Boolean logic. The entity cohort system provides segment labels to the matched documents.

In an embodiment, the entity cohort system generates entity segments based on the matched document of the entity with the segment labels. In an embodiment, the entity segments are created based on a search segment definition.

In an embodiment, offline data from a new source is on-boarded to data available in the database of an identity management server which is communicatively connected to the entity estimation system 106. In an embodiment, the identity management server creates and maintains a private unique entity identifier graph for the new source by running the on-boarded offline data in the identity management server.

In an embodiment, the data from the new source may include cookie stream, a mobile application usage stream, etc.

In an exemplary embodiment, the hypercube estimator 212 described herein and illustrated in the figure is embodied as hardware and may be configured as electronic circuits, devices, digital chip, and discrete elements packaged onto a circuit board to provide data and signal processing functionality within a computer for performing various functionalities and to support scalability.

Figure 3:
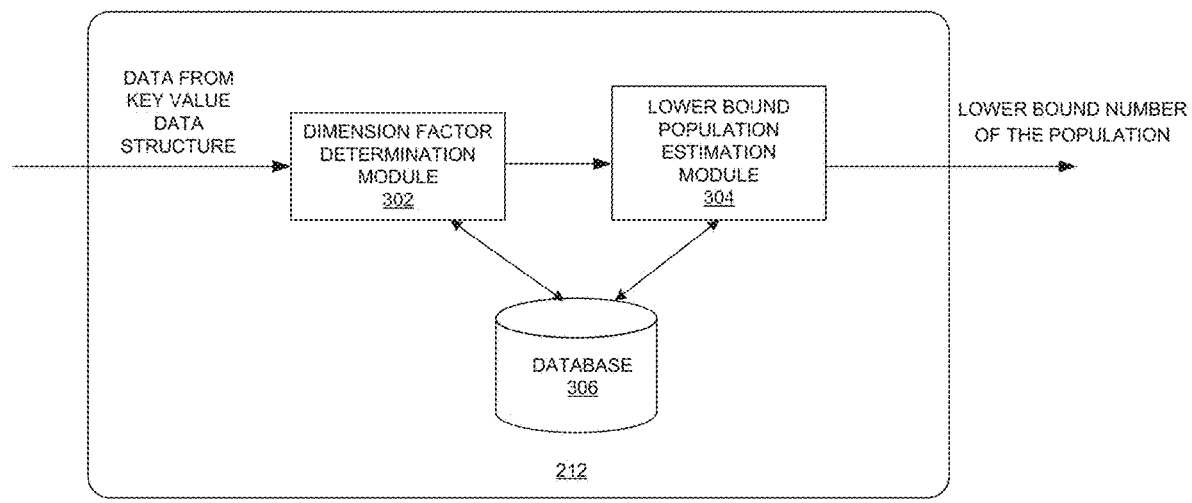
FIG. 3 is an exploded view of a hyper-cube estimator of FIG. 2 according to an embodiment herein.

FIG. 3 is an exploded view of a hyper cube estimator 212 of FIG. 2 according to an embodiment herein. The hyper cube estimator 212 includes a dimension factor determination module 302, a lower bound entity count estimation module 304 and a database 306. The dimension factor determination module 302 determines a dimensional factor for each dimension by processing the number of unique entity identifiers and time stamp data stored in the key value data structure according to each dimension. The lower bound entity count estimation module 304 determines a lower bound number of the entity count for each or combinations of the one or more spatio-temporal dimensions based on the dimension factor for each of the one or more spatio-temporal dimensions and base cardinality of each or combinations of the one or more spatio temporal dimensions. The database 306 stores a machine learning based time series model. The hyper cube estimator 212 estimates the lower bound spatio-temporal based on data from the key value data structure.

Figure 4:
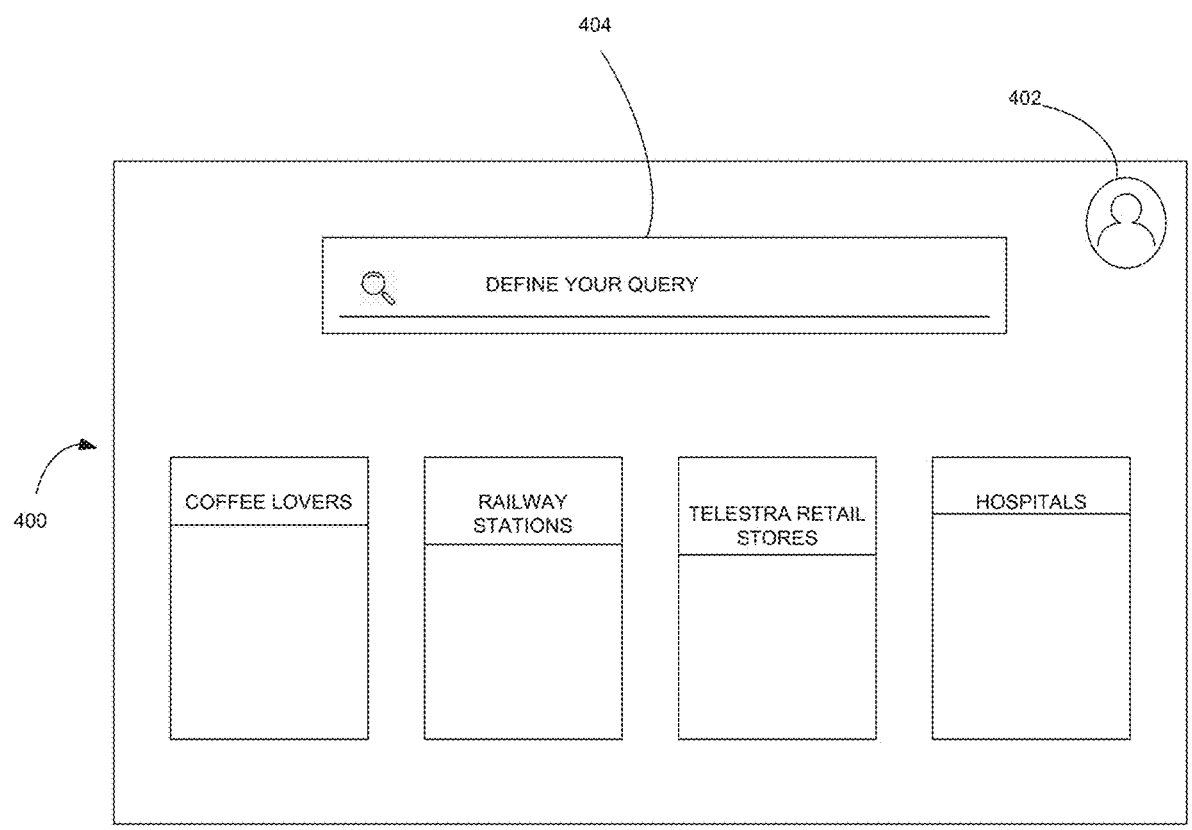
FIG. 4 is an exemplary user interface view of a home page of the entity estimation system according to an embodiment herein.

FIG. 4 is an exemplary user interface view of a home page 400 of the entity estimation system 106 according to an embodiment herein. The home page 400 includes a login interface 402 and a query defining space 404. The login interface 402 enables a user to login to the entity estimation system 106 by providing a user id and a password. The query defining space 404 enables the user to define a search query in a natural language upon login to the entity estimation system 106.

Figures 5A, 5B:
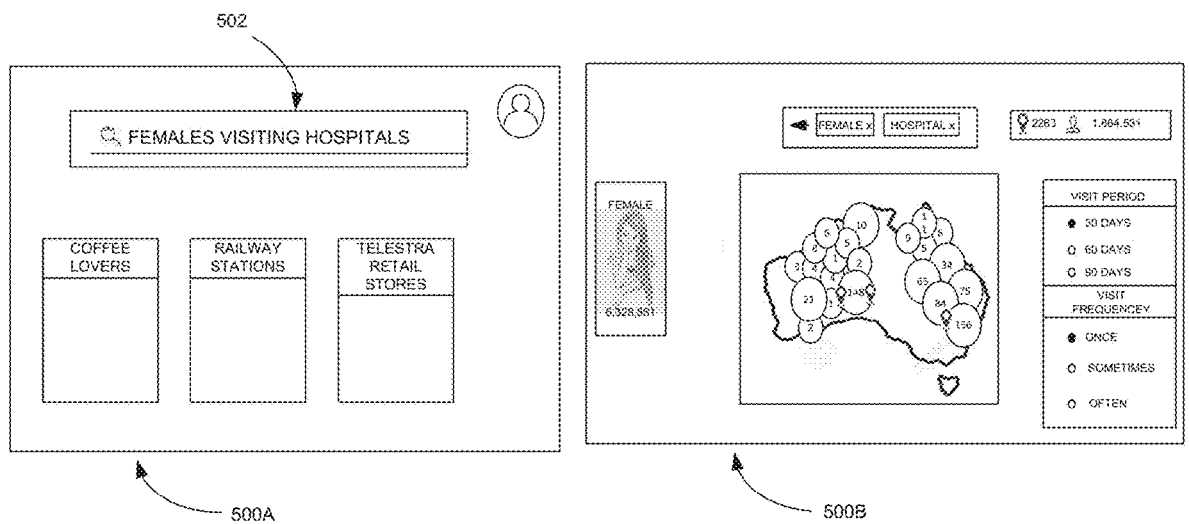
FIGS. 5A and 5B are exemplary user interface views of a search page and a result page of the entity estimation system respectively according to an embodiment herein.

FIGS. 5A and 5B are exemplary user interface views of a search page 500A and a result page 500B of the entity estimation system 106 respectively according to an embodiment herein. The search page 500A includes a query defining space 502 that allows a user to enter a query related to spatio temporal entity count. The result page 500B provides the search results based on the query provided by the user. In one embodiment, the user interface view of result page 500B allows the user to provide additional selection criteria to the search result.

Figure 6:
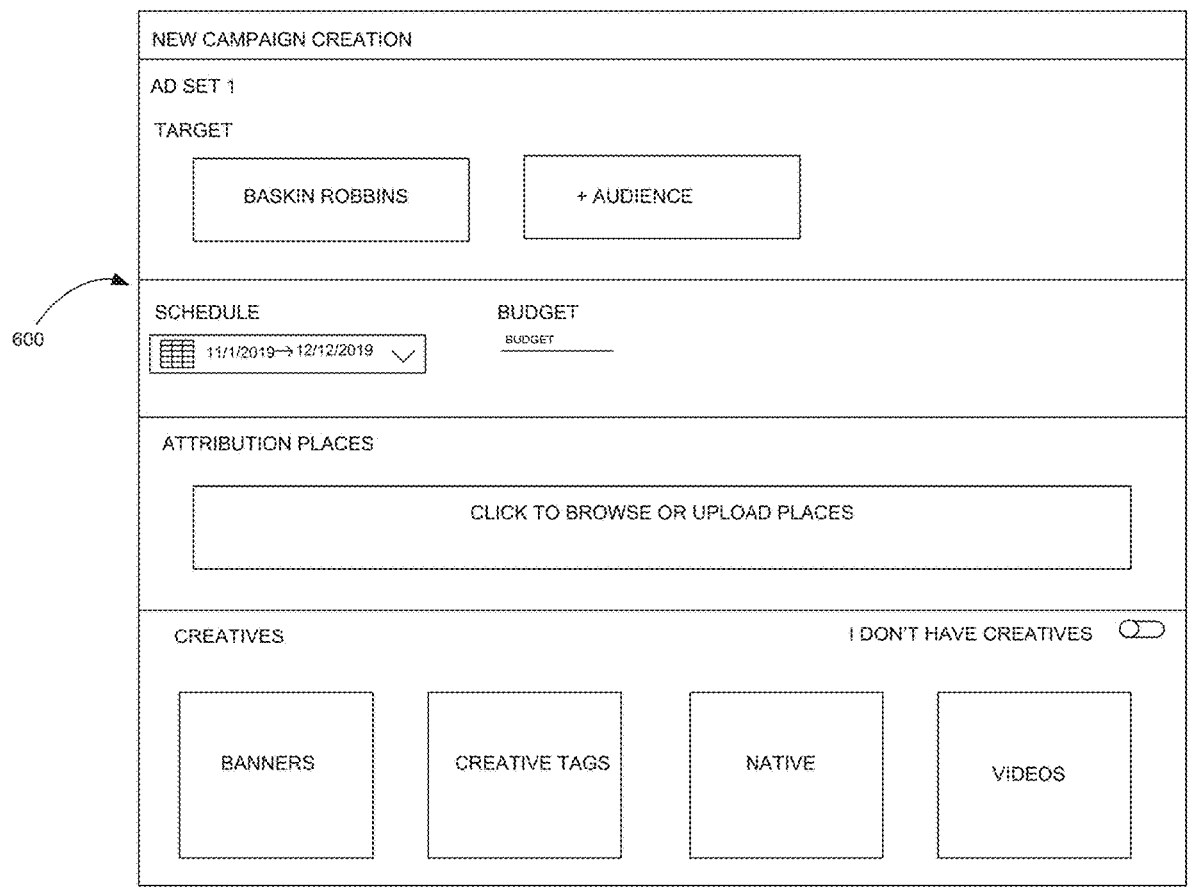
FIG. 6 is an exemplary user interface view of a marketing campaign strategy creation page of the media planning system according to an exemplary embodiment herein.

FIG. 6 is an exemplary user interface view of a marketing campaign strategy creation page 600 of the media planning system 104 according to an exemplary embodiment herein. The entity estimation system 106 embedded in the media planning system 104 estimates spatio-temporal entity counts in response to a query provided by the user. The strategy creation page 600 of the media planning system 104 allows a user to create strategy based on the estimated spatio-temporal entity counts.

Figure 7B:
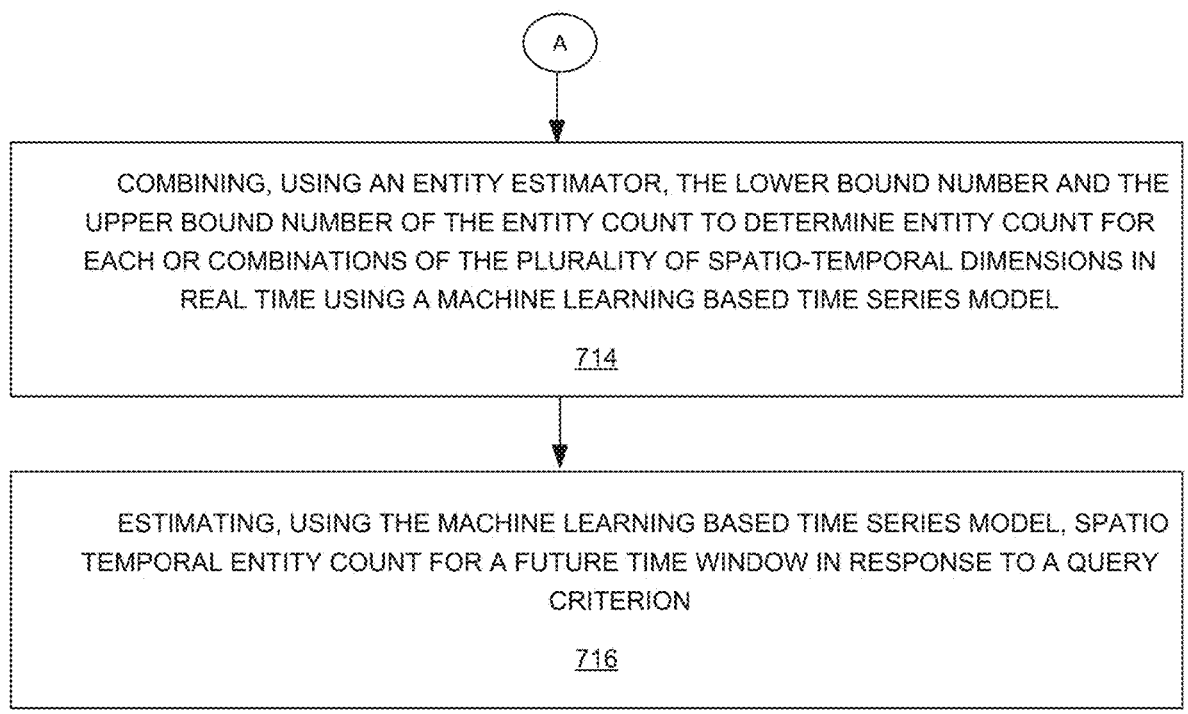

FIGS. 7A and 7B are flowcharts that illustrate a method of estimating spatio-temporal entity counts in real time and for a future time window based on machine learning from partially observable location data according to an embodiment herein. At step 702, one or more data streams with a unique entity identifier are obtained using a data aggregator 202 from independently controlled sources. In one embodiment, the one or more data streams include timestamp data and location indexed data that partially characterizes an activity of a user associated with the unique entity identifier. At step 704, the one or more data streams are transformed into geolocation of the entity using a geocoder 206. At step 706, corresponding geolocation of the entity in a hyper-cube computational data structure 204 that is spatially partitioned with geo hashes in terms of a key value data structure for one or more geolocations is identified using a geolocation mapper 208 by mapping the geolocation of the one or more entity with the key value data structure in the hyper-cube computational data structure 204. At step 708, the key value data structure that corresponds to geolocation of the entity is updated with the unique entity identifier and the timestamp data using a key value data structure updater 210. At step 710, a lower bound number of an entity count for each or combinations of one or more spatio temporal dimensions are determined using a hyper cube estimator 212 based on the unique entity identifier and the timestamp data updated in the geolocation of the key value data structure. At step 712, an upper bound number of the spatio temporal for each or combinations of the one or more spatio temporal dimensions are determined using a census-based extrapolator 214 by extrapolating recent census data. At step 714, an entity count for each or combinations of the one or more spatio temporal dimensions is determined in real time using an entity estimator 216 by combining the lower bound number and the upper bound number of the entity count using a machine learning based time series model. At step 716, an estimate of the spatio-temporal entity count in a future time window is predicted in response to a query criterion using the machine learning based time series model.

Figure 8:
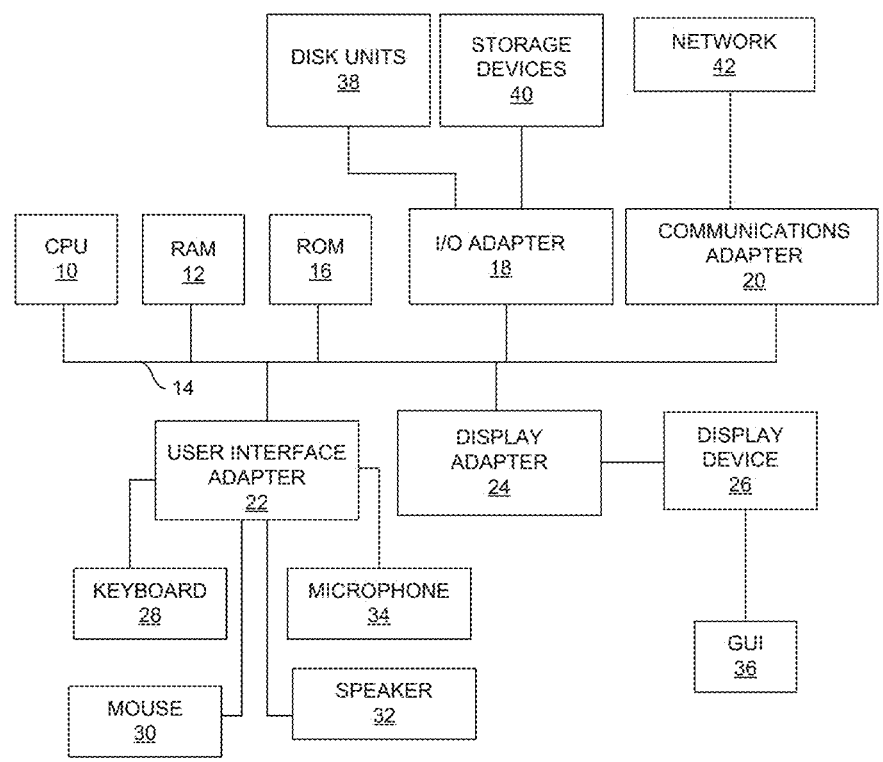
FIG. 8 is a schematic diagram of computer architecture of a computing device, in accordance with the embodiments herein.

FIG. 8 is a schematic diagram of computer architecture of a computing device, in accordance with the embodiments herein. A representative hardware environment for practicing the embodiments herein is depicted in FIG. 8, with reference to FIGS. 1 through 7. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of automatically estimating spatio-temporal entity counts in real time and for a future time window using machine learning from partially observable location data, the method comprising:
    obtaining, in real time, a plurality of data streams with a unique entity identifier from independently controlled sources, wherein the plurality of data streams comprises timestamp data and location indexed data that partially characterizes an activity of an entity associated with the unique entity identifier;
    transforming, using a geocoder, the plurality of data streams into geolocation of the entity;
    identifying, using a geolocation mapper, corresponding geolocation of the entity in a hyper-cube computational data structure that is spatially partitioned with geo hashes in terms of a key value data structure for a plurality of geolocations by mapping the geolocation of the entity with corresponding key value data structure in the hyper-cube computational data structure;
    updating, in real time, the key value data structure that corresponds to geolocation of the entity, with the unique entity identifier and the timestamp data;
    determining, using a hyper cube estimator, a lower bound number of an entity count for each or combinations of a plurality of spatio temporal dimensions based on the unique entity identifier and the timestamp data updated in the geolocation of the key value data structure;
    determining, using a census-based extrapolator, an upper bound number of the entity count each or combinations of the plurality of spatio temporal dimensions by extrapolating recent census data;
    combining, using an entity estimator, the lower bound number and the upper bound number of the entity count for determining an entity count for each or combinations of the plurality of spatio temporal dimensions in real time using a machine learning based time series model; and
    estimating, using the machine learning based time series model, spatio temporal entity count for a future time window in response to a query criterion.

2. The method as claimed in claim 1, wherein the lower bound number of the entity count for each or combinations of the plurality of spatio temporal dimensions is determined by
    identifying a dimensional factor for each of the plurality of spatio temporal dimensions by processing the unique entity identifier and the timestamp data updated in the geolocation of the key value data structure; and
    determining the lower bound number of the entity count for each or combinations of the plurality of spatio temporal dimensions based on the dimension factor of each of the plurality of spatio temporal dimensions and base cardinality of each or combinations of the plurality of spatio temporal dimensions.

3. The method as claimed in claim 2, wherein the method further updating, using Bayesian updating techniques, the dimensional factor when a new data stream arrives for the data aggregator.

4. The method as claimed in claim 1, wherein the machine learning based time series model is configured to train with real time entity count data to receive an input query related to entity count and to output spatio-temporal entity counts in response to the input query.

5. The method as claimed in claim 1, wherein the location indexed data comprises latitude data and longitude data.

6. The method as claimed in claim 1, wherein the key value data structure is maintained temporally for each of the plurality of spatio temporal dimensions.

7. The method as claimed in claim 1, wherein the plurality of data streams further comprises at least one of (i) non location indexed traffic data, (ii) digital visit count to global website or (iii) social media activities.

8. The method as claimed in claim 1, wherein the method further comprises generating, using a sample generation method, a ground truth data based on traffic and navigation data associated with the one or more entities for validating the determined entity count in real time for each or combinations of the plurality of spatio temporal dimensions, wherein the traffic and navigation data is obtained from traffic sensors or a public CCTV camera.

9. The method as claimed in claim 1, wherein the plurality of data streams with a unique entity identifier are obtained from a plurality of user devices engaged with at least one of (i) a plurality of applications, (ii) a wireless network, or (iii) a mobile network.

10. The method as claimed in claim 1, wherein the method comprises de-duplicating the plurality of data streams from the plurality of entity devices engaged with at least one of (i) the plurality of applications, (ii) the wireless network, or (iii) the mobile network, based on the unique user identifier.

11. The method as claimed in claim 1, wherein the method further comprises segmenting, using a plurality of attributes, the estimated spatio-temporal entity count (i) for delivering target media content and communicating the target media content to a plurality of entity devices associated with the segmented spatio-temporal entity count, (ii) for traffic estimation on road networks, (iii) for population diffusion estimation in an area, and (iv) number of physical stores estimation in different areas by product category.

12. A system for automatically estimating spatio-temporal entity counts in real time and for a future time window using machine learning from partially observable location data, the system comprises:
    a data aggregator that is configured to obtain in real time a plurality of data streams with a unique entity identifier from independently controlled sources, wherein the plurality of data streams comprises timestamp data and location indexed data that partially characterizes an activity of an entity associated with the unique entity identifier;
    a geocoder that is configured to transform the plurality of data streams into geolocation of the entity;

a geolocation mapper that is configured to identify corresponding geolocation of the entity in a hyper-cube computational data structure that is spatially partitioned with geo hashes in terms of a key value data structure for a plurality of geolocations by mapping the geolocation of the entity with the key value data structure in the hyper-cube computational data structure;

a key value data structure updater that is configured to update in real time the key value data structure that corresponds to geolocation of the entity, with the unique entity identifier and the timestamp data;

a hyper cube estimator that is configured to determine a lower bound number of an entity count for each or combinations of a plurality of spatio temporal dimensions based on the unique entity identifier and the timestamp data updated in the geolocation of the key value data structure;

a census-based extrapolator that is configured to determine an upper bound number of the entity count for each or combinations of the plurality of spatio temporal dimensions by extrapolating recent census data;

an entity estimator that is configured to (i) determine an entity count for each or combinations of the plurality of spatio temporal dimensions in real time by combining the lower bound number and the upper bound number of the entity count using a machine learning based time series model, and (ii) estimate, using the machine learning based time series model, spatio temporal entity count for a future time window in response to a query criterion.

13. The system as claimed in claim 12, wherein the hyper cube estimator determines the lower bound number of the entity count for each or combinations of the plurality of spatio temporal dimensions by identifying a dimensional factor for each of the plurality of spatio temporal dimensions by processing the unique entity identifier and the time stamp data updated in the geolocation of the key value data structure; and determining the lower bound number of the entity count for each or combinations of the plurality of spatio temporal dimensions based on the dimension factor of each of the plurality of spatio temporal dimensions and base cardinality of each or combinations of the plurality of spatio temporal dimensions.

14. The system as claimed in claim 13, wherein the hyper cube estimator updates, using Bayesian updating techniques, the dimensional factor when a new data stream arrives for the data aggregator.

15. The system as claimed in claim 12, wherein the machine learning based time series model is configured to train with real time entity count data to receive an input query related to entity count and to output spatio-temporal entity counts in response to the input query.

16. The system as claimed in claim 12, wherein the location indexed data comprises latitude data and longitude data.

17. The system as claimed in claim 12, wherein the key value data structure is maintained temporally for each of the plurality of spatio temporal dimensions.

18. The system as claimed in claim 12, wherein the plurality of data streams further comprises at least one of (i) non location indexed traffic data, (ii) digital visit count to global website, or (iii) social media activities.

19. The system as claimed in claim 12, wherein the system further generates, using a sample generation method, a ground truth data based on traffic and navigation data associated with the one or more entities for validating the determined entity count in real time for each or combinations of the plurality of spatio temporal dimensions, wherein the traffic and navigation data is obtained from traffic sensors or a public CCTV camera.

20. A one or more non-transitory computer-readable storage mediums storing the one or more sequences of instructions, which when executed by the one or more processors, causes to perform a method of automatically estimating spatio-temporal entity counts in real time and for a future time window using machine learning from partially observable location data, wherein the method comprises:

obtaining, in real time, a plurality of data streams with a unique entity identifier from independently controlled sources, wherein the plurality of data streams comprises timestamp data and location indexed data that partially characterizes an activity of an entity associated with the unique entity identifier;

transforming, using a geocoder, the plurality of data streams into geolocation of the entity;

identifying, using a geolocation mapper, corresponding geolocation of the entity in a hyper-cube computational data structure that is spatially partitioned with geo hashes in terms of a key value data structure for a plurality of geolocations by mapping the geolocation of the entity with the key value data structure in the hyper-cube computational data structure;

updating, in real time, the key value data structure that corresponds to geolocation of the entity, with the unique entity identifier and the timestamp data;

determining, using a hyper cube estimator, a lower bound number of an entity count for each or combinations of a plurality of spatio temporal dimensions based on the unique entity identifier and the timestamp data updated in the geolocation of the key value data structure;

determining, using a census-based extrapolator, an upper bound number of the entity count for each or combinations of the plurality of spatio temporal dimensions by extrapolating recent census data;

combining, using an entity estimator, the lower bound number and the upper bound number of the entity count for determining an entity count for each or combinations of the plurality of spatio temporal dimensions in real time using a machine learning based time series model; and estimating, using the machine learning based time series model, spatio temporal entity count for a future time window in response to a query criterion.

* * * * *